Nov. 15, 1955

H. W. MATTHEWS 2,723,618

FRUIT JUICE EXTRACTORS

Filed April 23, 1951

11 Sheets-Sheet 1

INVENTOR:
Howard W. Matthews,
BY Paul & Paul
ATTORNEYS.

INVENTOR:
Howard W. Matthews,
BY Paul & Paul
ATTORNEYS.

Nov. 15, 1955 H. W. MATTHEWS 2,723,618

FRUIT JUICE EXTRACTORS

Filed April 23, 1951 11 Sheets-Sheet 3

INVENTOR:
Howard W. Matthews,
BY Paul & Paul
ATTORNEYS.

INVENTOR:
Howard W. Matthews,
BY Paul & Paul
ATTORNEYS.

Nov. 15, 1955 H. W. MATTHEWS 2,723,618

FRUIT JUICE EXTRACTORS

Filed April 23, 1951 11 Sheets-Sheet 5

INVENTOR:
Howard W. Matthews,

BY Paul & Paul

ATTORNEYS.

INVENTOR:
Howard W. Matthews,
BY Paul & Paul
ATTORNEYS.

Nov. 15, 1955 H. W. MATTHEWS 2,723,618

FRUIT JUICE EXTRACTORS

Filed April 23, 1951 11 Sheets-Sheet 7

INVENTOR:
Howard W. Matthews,

BY Paul & Paul

ATTORNEYS.

Nov. 15, 1955 H. W. MATTHEWS 2,723,618

FRUIT JUICE EXTRACTORS

Filed April 23, 1951 11 Sheets-Sheet 8

INVENTOR:
Howard W. Matthews,
BY Paul & Paul
ATTORNEYS.

Nov. 15, 1955 H. W. MATTHEWS 2,723,618

FRUIT JUICE EXTRACTORS

Filed April 23, 1951 11 Sheets-Sheet 9

INVENTOR:
Howard W. Matthews,
BY Paul & Paul
ATTORNEYS.

Nov. 15, 1955 H. W. MATTHEWS 2,723,618

FRUIT JUICE EXTRACTORS

Filed April 23, 1951 11 Sheets-Sheet 10

INVENTOR:
Howard W. Matthews,
BY Paul & Paul
ATTORNEYS.

Nov. 15, 1955 H. W. MATTHEWS 2,723,618

FRUIT JUICE EXTRACTORS

Filed April 23, 1951 11 Sheets-Sheet 11

INVENTOR:
Howard W. Matthews,
BY Paul & Paul
ATTORNEYS.

United States Patent Office 2,723,618

Patented Nov. 15, 1955

2,723,618

FRUIT JUICE EXTRACTORS

Howard William Matthews, Souderton, Pa.; Ethel K. Matthews, Elmer J. Matthews, and Robert H. Kline, executors of said Howard William Matthews, deceased, assignors to Turbo Machine Company, Lansdale, Pa., a corporation of Pennsylvania Application April 23, 1951, Serial No. 222,391

15 Claims. (Cl. 100—53)

This invention relates to fruit juice extractors. More specifically, it is concerned with machines of the type disclosed in U. S. Patent No. 2,311,565 granted to Talbert G. Nelson on February 16, 1943, for extracting the juice from oranges and the like, wherein whole oranges are fed to a severing means and cut into halves, the halves are advanced, face downward, into position respectively over stationary male press elements, then squeezed by cup-like female press elements moved down axially into press relation over the male press elements, with incidental collection of the extracted juice, and the orange rinds finally are ejected from the machine upon retraction of the female press elements after the pressing.

Amongst the aims of my invention are to generally simplify the construction and enhance the efficiency of extracting machines of the type referred to; to provide improved power means for operating the machines, with controls capable of being set to stop the machines after the completion of a cycle, or to allow them to operate continuously to cut and squeeze any desired number of oranges in succession; to provide improved means for definitely determining delivery of oranges from a supply hopper for advance, one at a time, to the severing and press elements; to provide safety means for preventing operation of the machines in the event of disalignment between the opposing press elements; and to provide improved means for insuring release of the rinds from the press elements in preparation for ejection.

Other objects and attendant advantages will appear from the following detailed description of the attached drawings, wherein.

Figure 3:
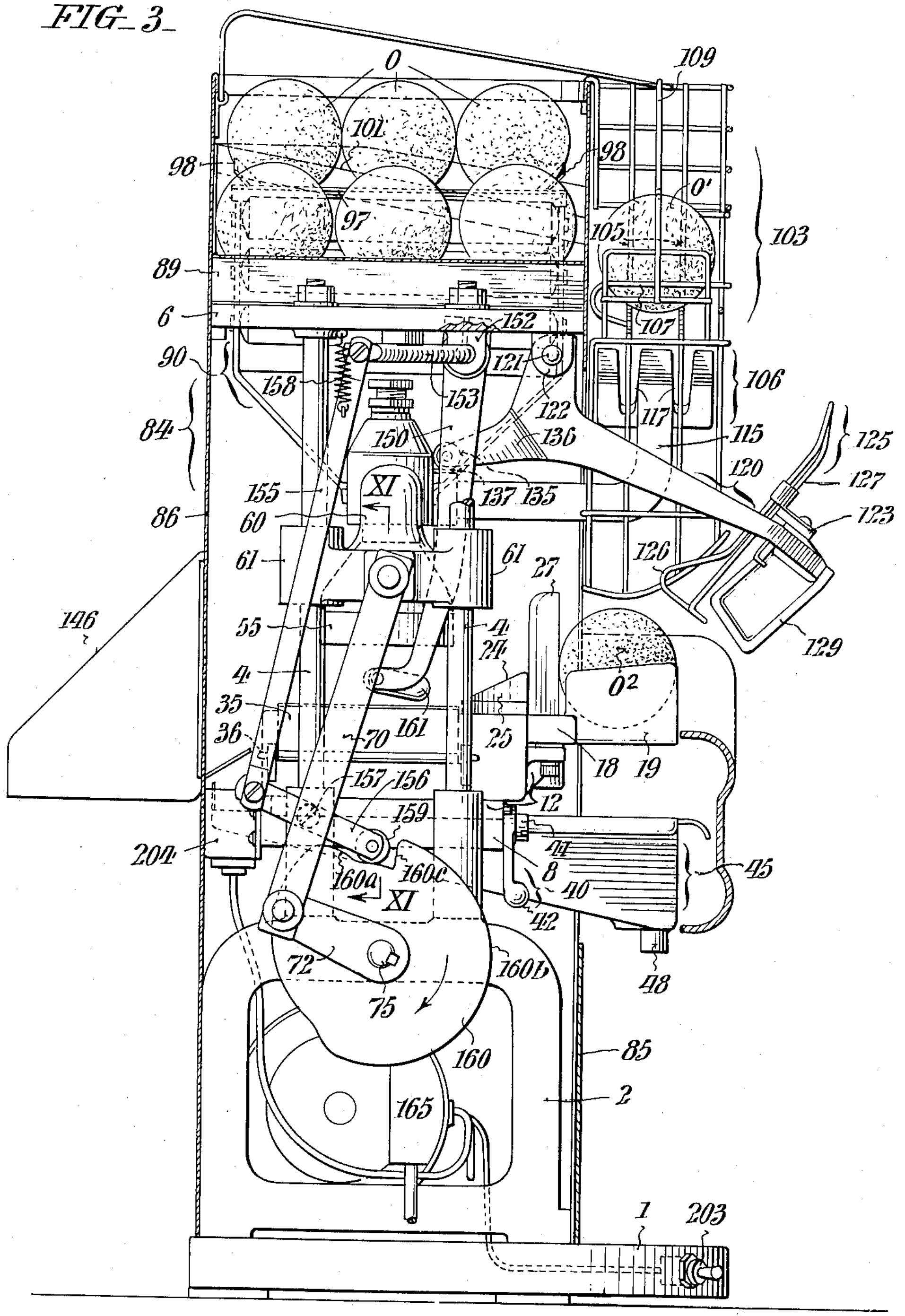
Fig. 3 is a sectional view of the machine taken as indicated by the angled arrows III—III in Fig. 2.
Figure 10:
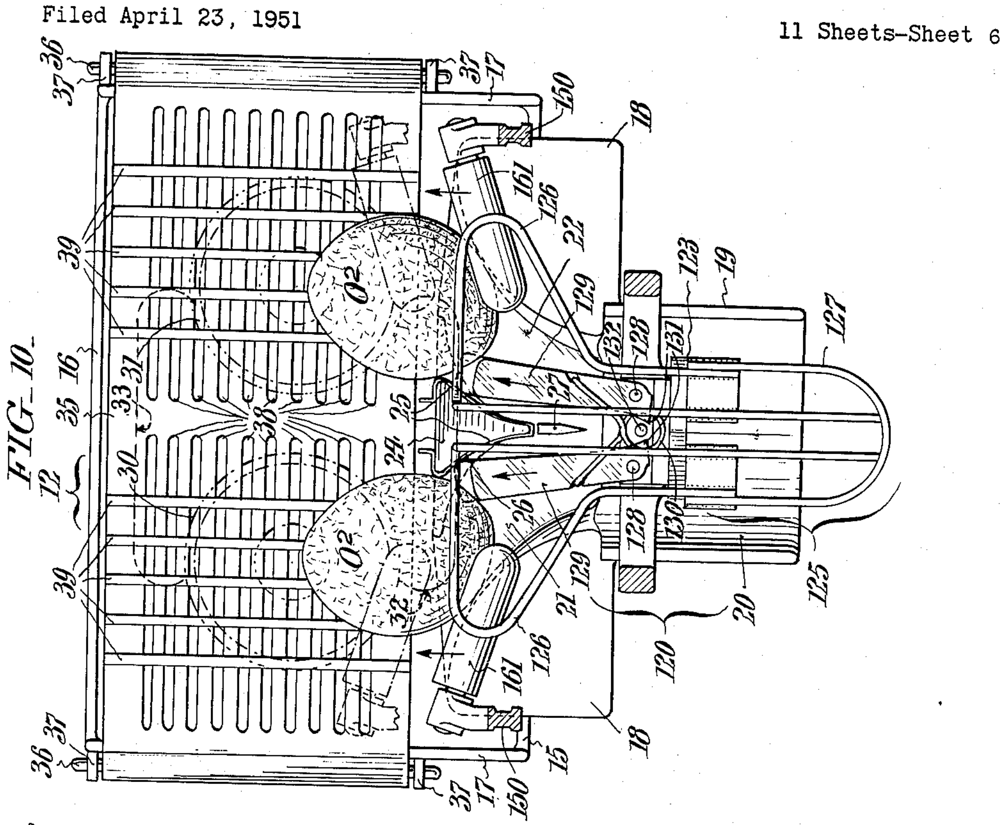
Figs. 9 and 10 are fragmentary views in horizontal section, corresponding to Fig. 4, respectively showing how an orange is cut and how the halves thereof are moved into position in readiness to be pressed.
Figure 9:
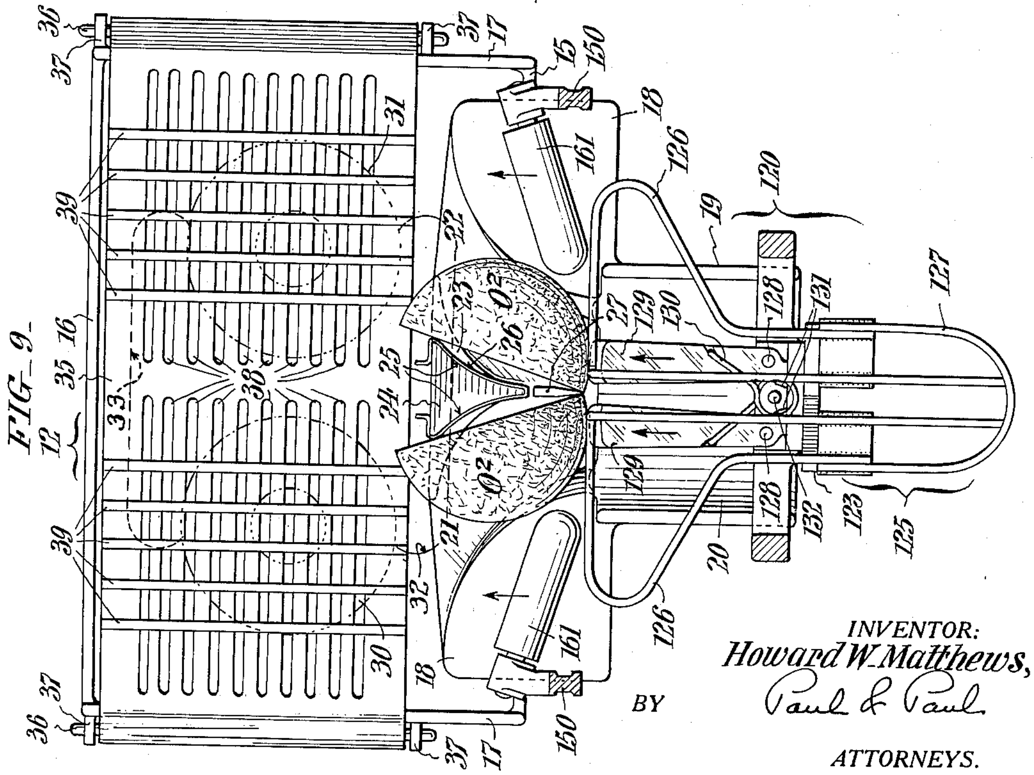
Figure 4:
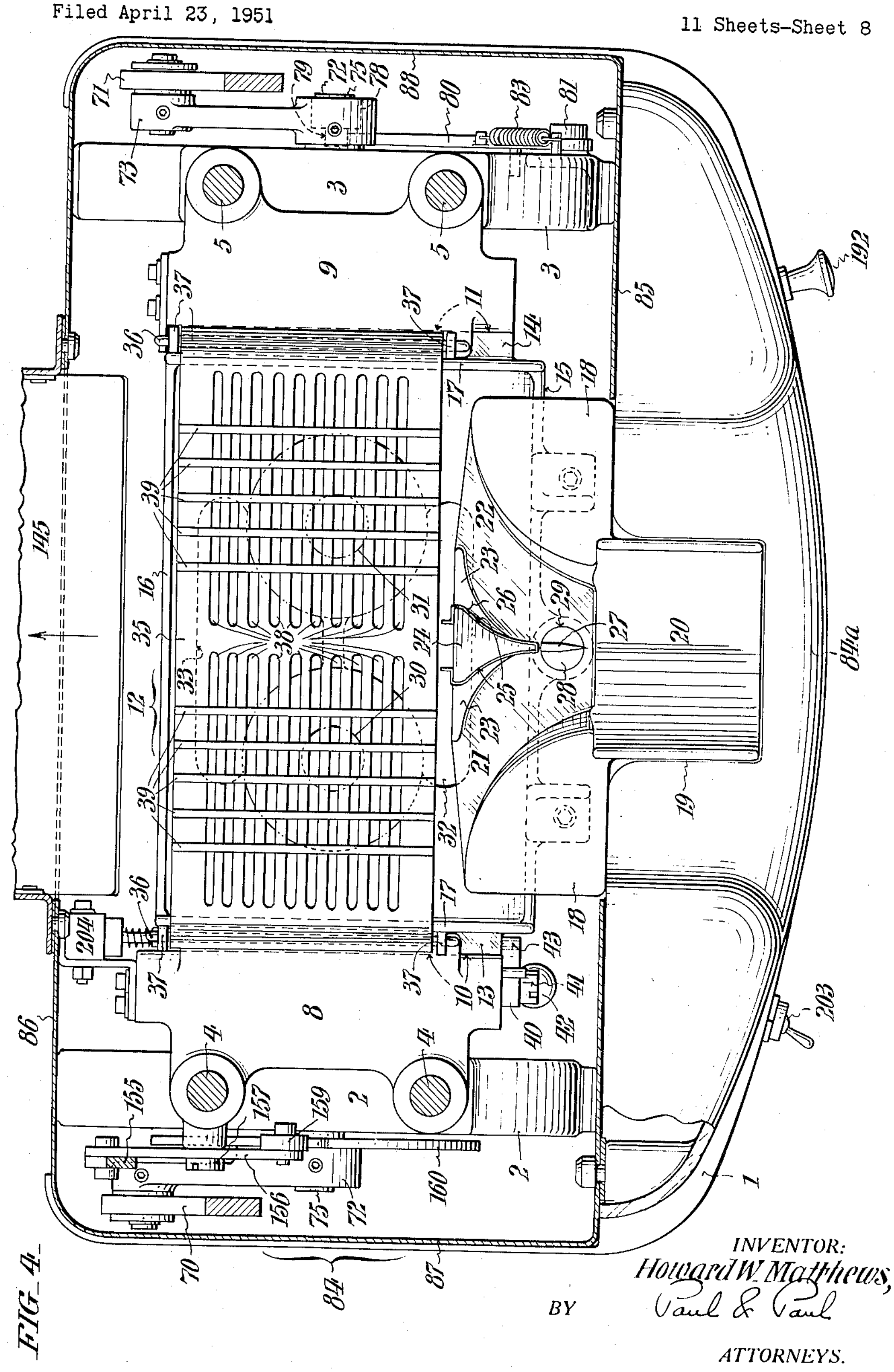
Fig. 4 is a partial horizontal sectional view taken as indicated by the angled arrows IV—IV in Fig. 2.
Figure 15:
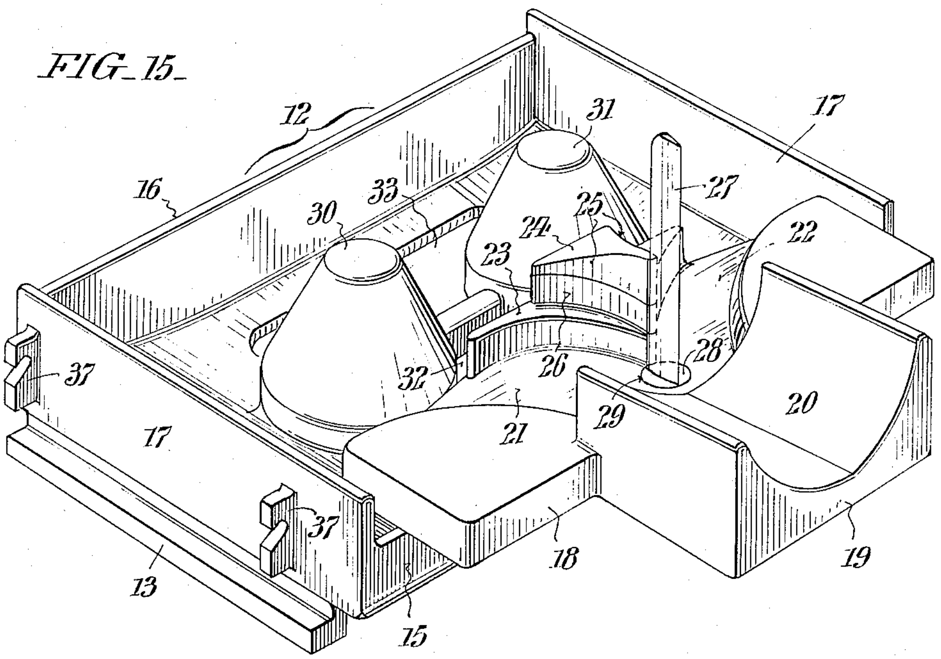
Fig. 15 is a perspective view of the juice collecting tray of the machine.

As shown in Figs. 1–6, my improved fruit juice extracting machine has a hollow base plate 1 with transversely-arranged open side frames 2 and 3 rising therefrom adjacent its opposite ends. Anchored in and upstanding from the side frames 2 and 3 are pairs of vertical rods 4 and 5 which, at their upper ends, support a centrally-open bridging frame 6. Rested on the tops of the side frames 2 and 3 and having apertured bosses engaged downwardly over the rods 4 and 5, are fixed members 8 and 9 which afford transverse guideways 10 and 11 for a forwardly removable tray 12. From Figs. 4, 11 and 15 it will be noted that the tray 12 is substantially rectangular and oblong in plan, and is provided at opposite ends along the bottom with runner flanges 13 and 14 to fit the ways 10 and 11 of the members 8 and 9. The front wall 15 of tray 12 is of less height than the rear and end walls 16, 17, and overhanging it is a shelf 18 with a central forward projection 19 whereof the top is concaved as at 20, the curvature of the concavity corresponding substantially to that of the oranges from which the juice is to be expressed. As shown, the shelf 18 is formed with symmetrically-disposed rearwardly and laterally curving gutters 21 and 22 whereof the bottoms decline inwardly somewhat toward the hollow of the tray. Upstanding centrally from the portion 23 of the shelf and forming the rear walls of the gutters 21 and 22, is a triangular shaped projection 24 of smaller plan area which terminates in a relatively sharp vertical edge at the front, and whereof the lateral faces 25 are concaved complementally to serve as cam surfaces for a purpose later explained. In practice, the tray 12 is preferably constructed from non-corrosive metal such as aluminum, and in order to minimize wear on the cam surfaces 25, a replaceable comformative clip-like element 26 is sprung over the projection 24. Positioned immediately forward of the projection 24 is a removable vertical knife blade 27 with a cylindric shank end 28 which fits into a socket hole 29 in the shelf 18. Rising from the bottom of the tray 12 and symmetrically-arranged with respect to the transverse medial plane through it, are dome-like projections 30 and 31 which constitute the male press elements of the machine, the same being substantially of equal height with the end walls 17 of the tray, see Fig. 11. The extracted fruit juice drains from the tray 12 through bottom openings 32 and 33 therein forwardly and rearwardly of the dome projections 30 and 31. Stretched across the tray so as to overlie the dome projections 30 and 31, is a flat elastic apron 35 (Figs. 4 and 9–11) of rubber or the like which is removably held in place through engagement of the protruding ends of reinforcing rods 36 at its opposite side edges under hook lugs 37 on the outer faces of the opposite end walls of the tray. As best shown in Figs. 4, 9 and 10, the apron 35 is slotted longitudinally as at 38, and is provided on its top surface with spaced transverse ridges 39 in the areas thereof directly overlying the dome projections 30 and 31. The tray is held against accidental displacement in the machine by a gravity latch element 40, see Figs. 2–4, which is pivoted on a stud 41 at the front of the guide member 8, and of which the grasp handle 42 is weighted for maintenance of its keeper end 43 in the path of the ledge 13 of said tray.

Disposed beneath the tray 12 is a forwardly-removable catch basin 45 which, in practice, is fashioned from non-corrosive sheet metal with flanges 46 along its opposite ends to engage in guide grooves 47 in the members 8 and 9. The bottom of the basin 45 slopes downwardly toward the front of the machine to a central outlet 48 which is in axial alignment with a cup or glass receiving depression 49 in forwardly extending portion of the machine base. Fitting into the basin 45 (Fig. 8) is a removable wire strainer 51 for intercepting any seeds and large pulp particles which may be carried down with the fruit juice from tray 12. The strainer 51 is separable from the basin 45 for convenience of ready removal and cleaning.

Figures 11, 12:
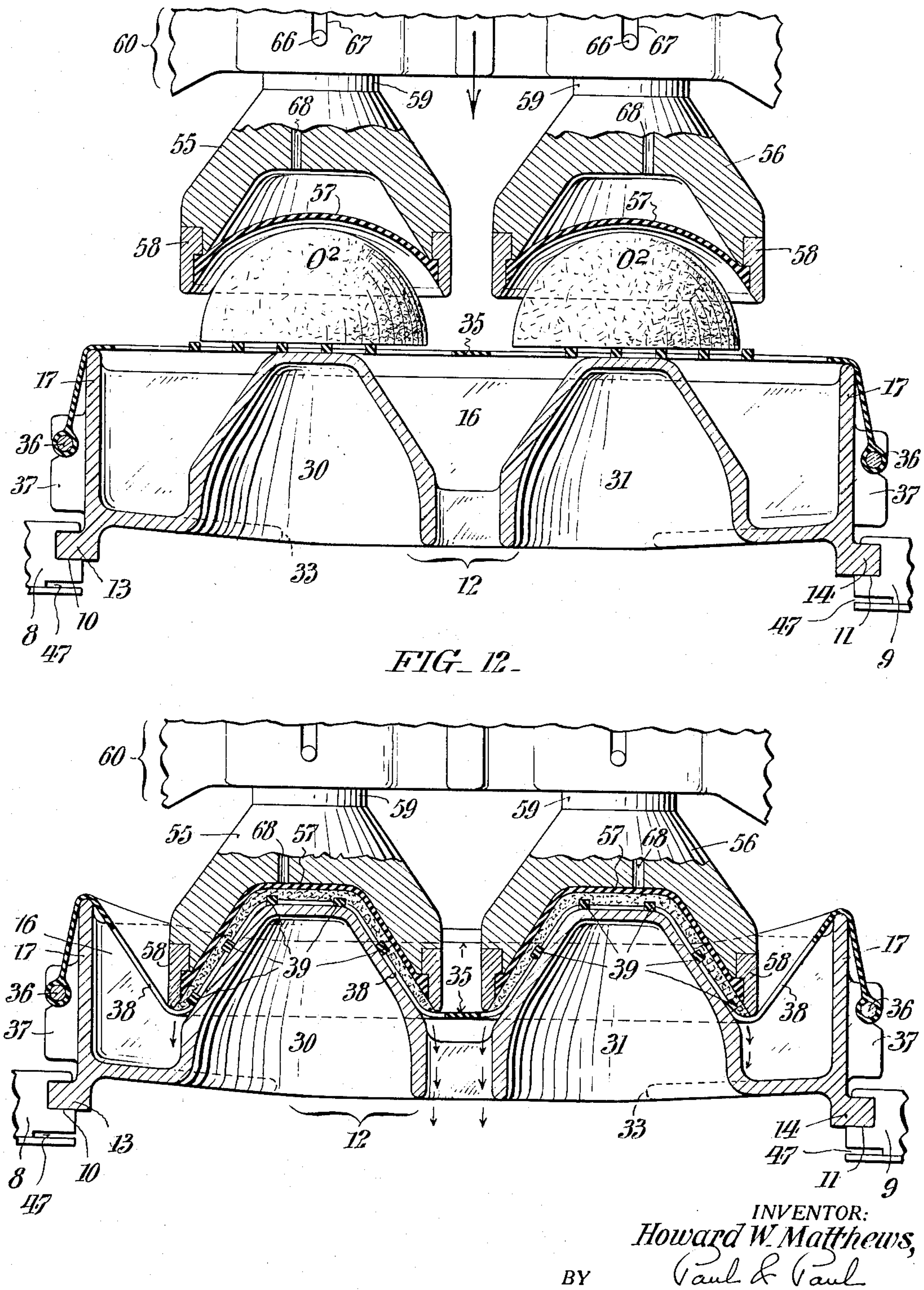
Fig. 11 is a fragmentary detail sectional view taken as indicated by the angled arrows XI—XI in Fig. 3, and showing the orange halves positioned between the press elements of the machine.
Fig. 12 is a fragmentary detail sectional view taken as indicated by the angled arrows XII—XII in Fig. 8, and showing the press elements in interengaged position and squeezing the juice from the orange halves.

Arranged to be moved downwardly over the male press elements 30, 31 in axial relation thereto, are hollow cup-like female press elements 55 and 56 with upwardly concaved elastic diaphragms 57 of rubber or the like spanning their bottom or mouth ends as shown in Fig. 11. In the illustrated instance, the diaphragms 57 are secured by vulcanization of their circumferential edges to rings 58 separately attached to the cups 55 and 56. The upward cylindric shanks 59 of the cups 55 and 56 are engaged, with capacity for axial movement, in a cross head 60 which, at opposite ends, is provided with apertured bosses 61 and 62 for guidance by the rods 4 and 5 hereinbefore mentioned. The cups 55 and 56 are individually biased downwardly by springs 63, see Fig. 8, which are regulatable by means of adjusting screws 65 engaged in the head 60. The independent movement of the cups is limited by engagement of the ends of diametrical pins 66 in their shanks with the opposite ends of vertical slots 67 in the cross head. The hollows of the cups 55 and 56 are relieved of pressure by way of axial ducts 68 in their shanks and vent holes 69 in the cross head as will be readily understood from Fig. 8.

Figure 5:
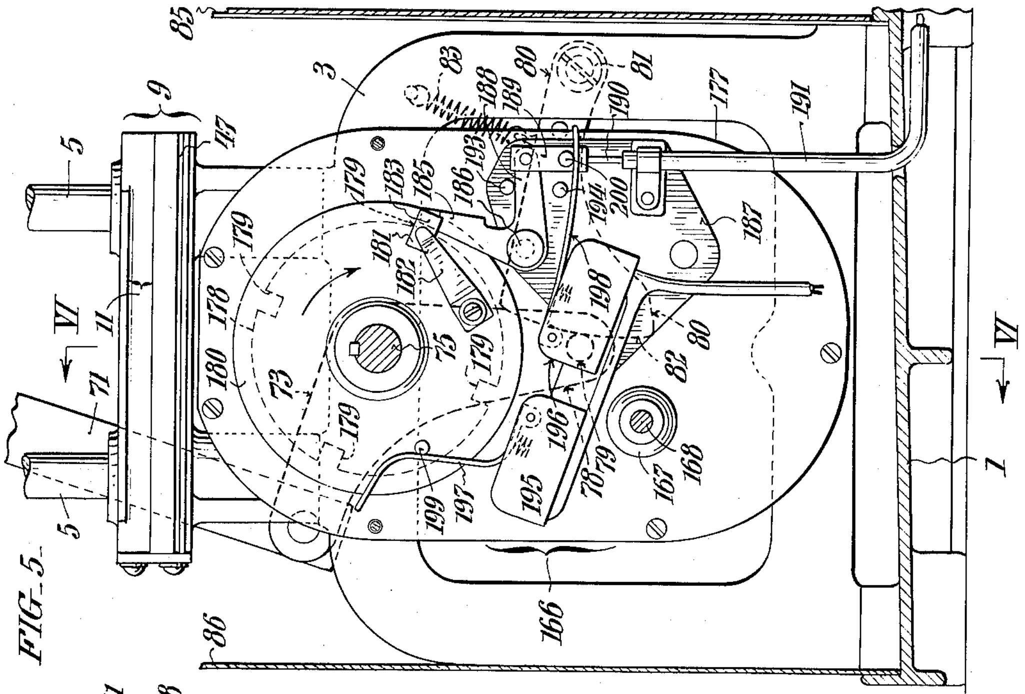
Fig. 5 is a fragmentary view in section in a staggered plane as indicated by the arrowed lines V—V in Figs. 2 and 6.
Figure 6:
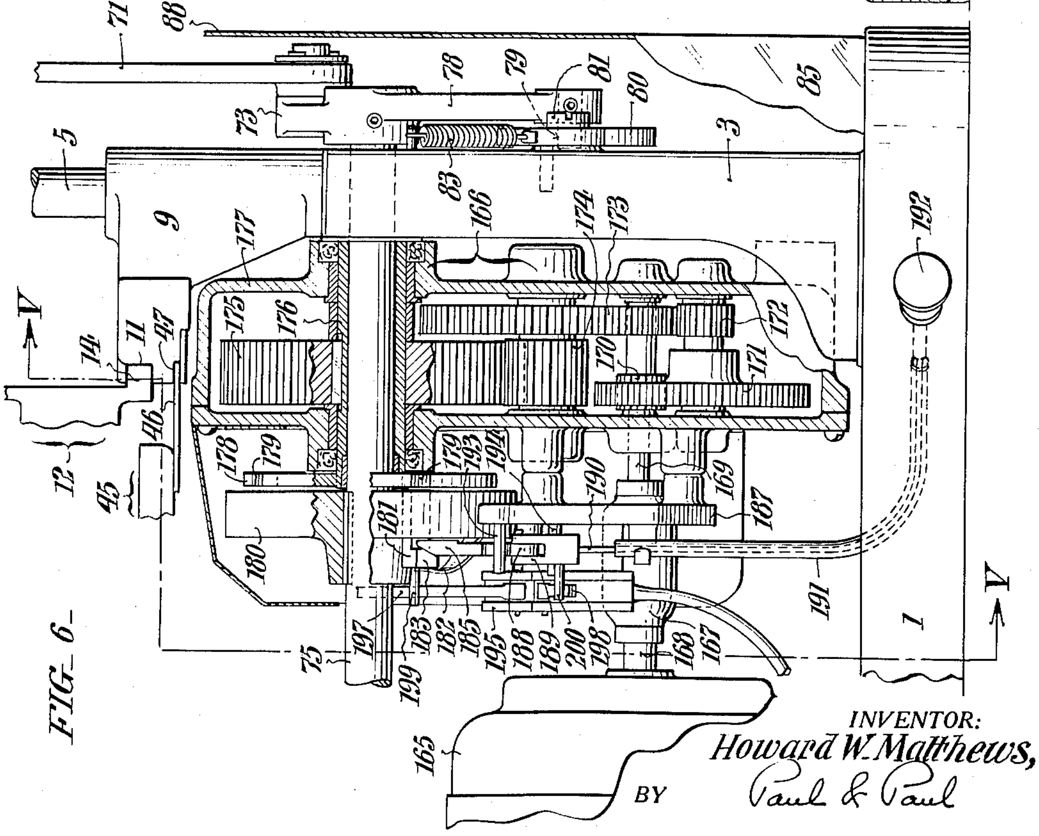
Fig. 6 is a fragmentary view, partly in elevation and partly in vertical section, taken as indicated by the angled arrows VI—VI in Fig. 5.

The cross head is actuated through pitmans or link bars 70 and 71, from cranks 72 and 73 respectively at opposite ends of a horizontal shaft 75 which is journalled in the side frames 2 and 3, and which is turned through one complete rotation for each operative cycle of the machine. As best shown in Figs 5 and 6, the crank 73 has a second arm 78 with a stud 79 at the free end thereof to cooperate with a stop element 80. This stop element is fulcrumed at 81 on side frame 3 and, at its distal end, has an arcuate cam edge 82 (Fig. 5) whereof the curvature is eccentric to the pivot axis against which the stud 79 normally bears. The spring indicated at 83 acts to keep the element 80 normally positioned as shown in Fig. 5, with capacity to yield to downward movement about the pivot 81 upon being actuated as later on explained.

Figure 1:
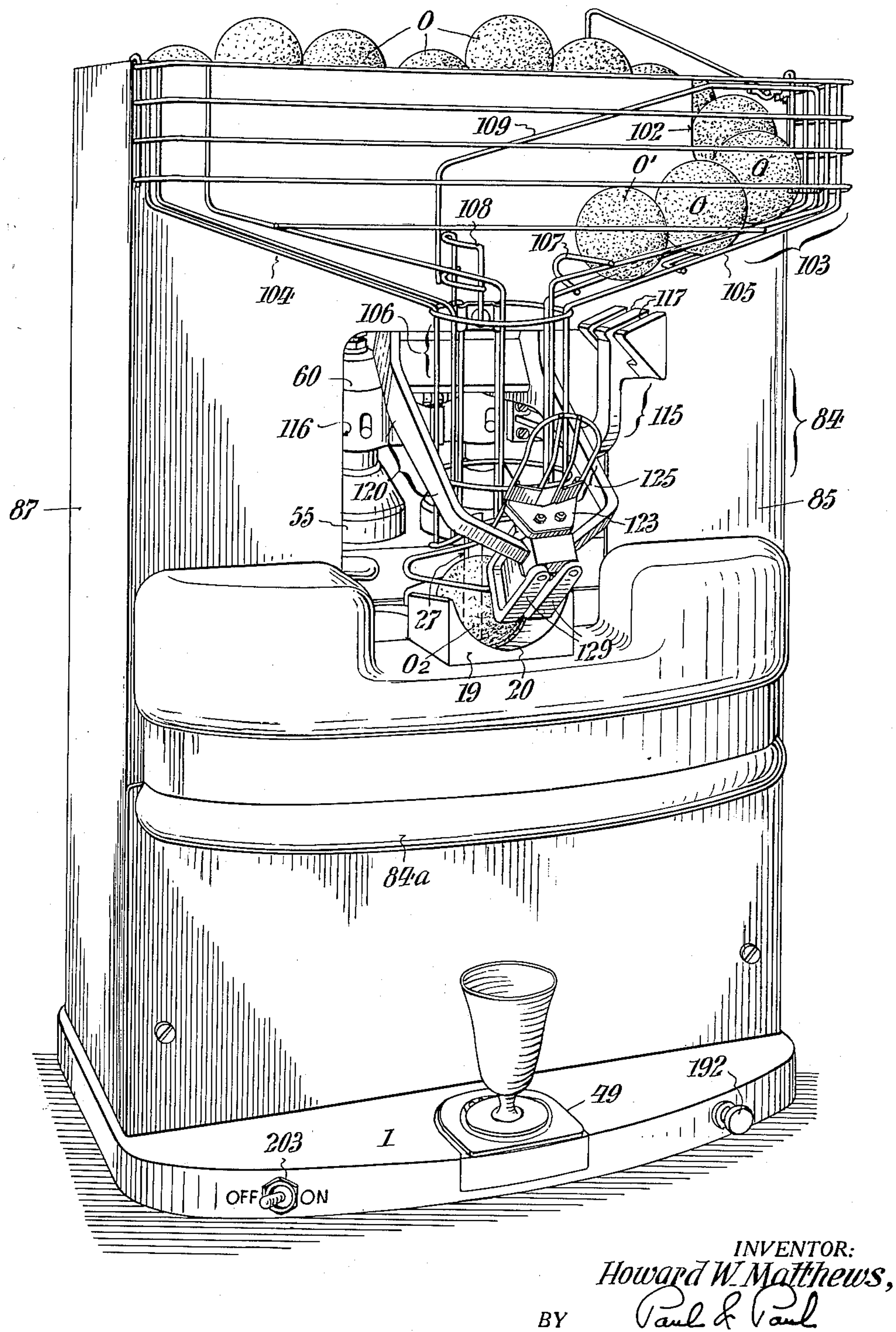
Fig. 1 is a perspective view of a fruit extracting machine conveniently embodying my invention and showing the same as viewed from the front thereof.
Figure 2:
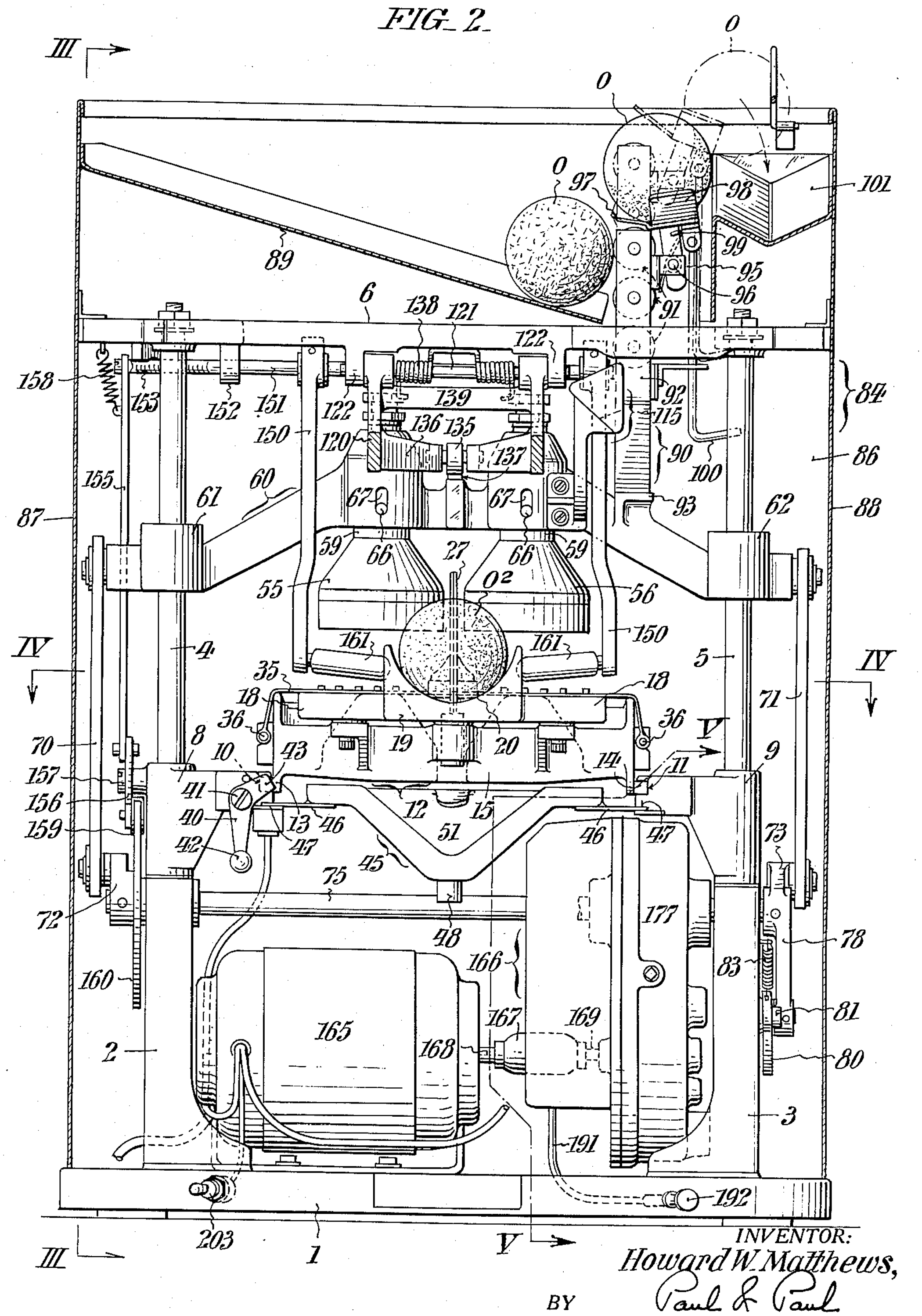
Fig. 2 is a front view of the machine with the front of its housing removed, and the side walls shown in section.
Figure 13:
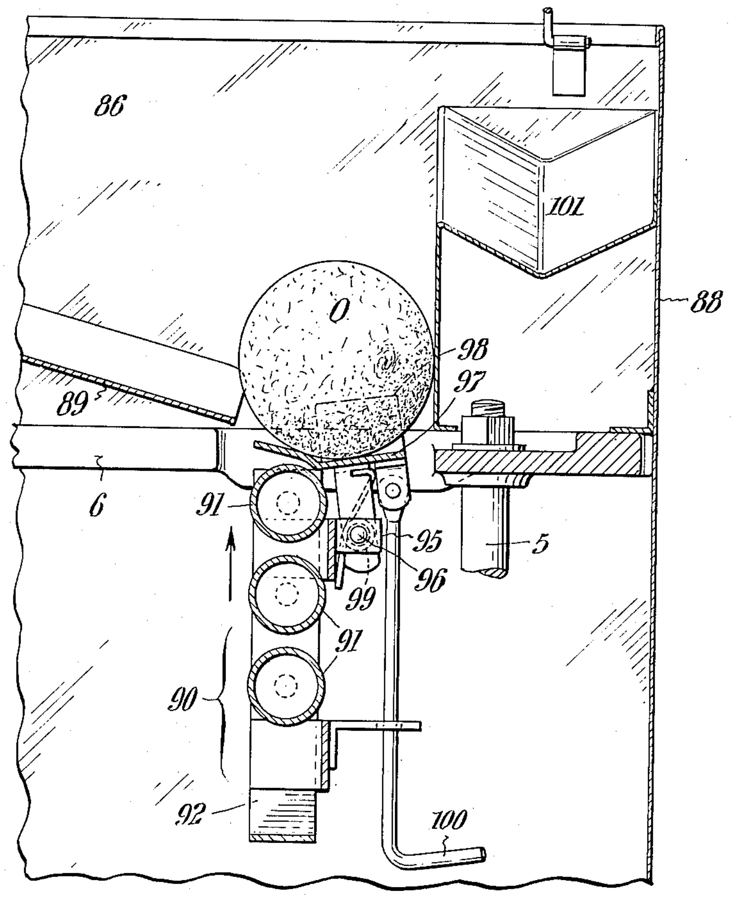
Fig. 13 is a fragmentary view in section taken as indicated by the angled arrows XIII—XIII in Fig. 8.
Figure 7:
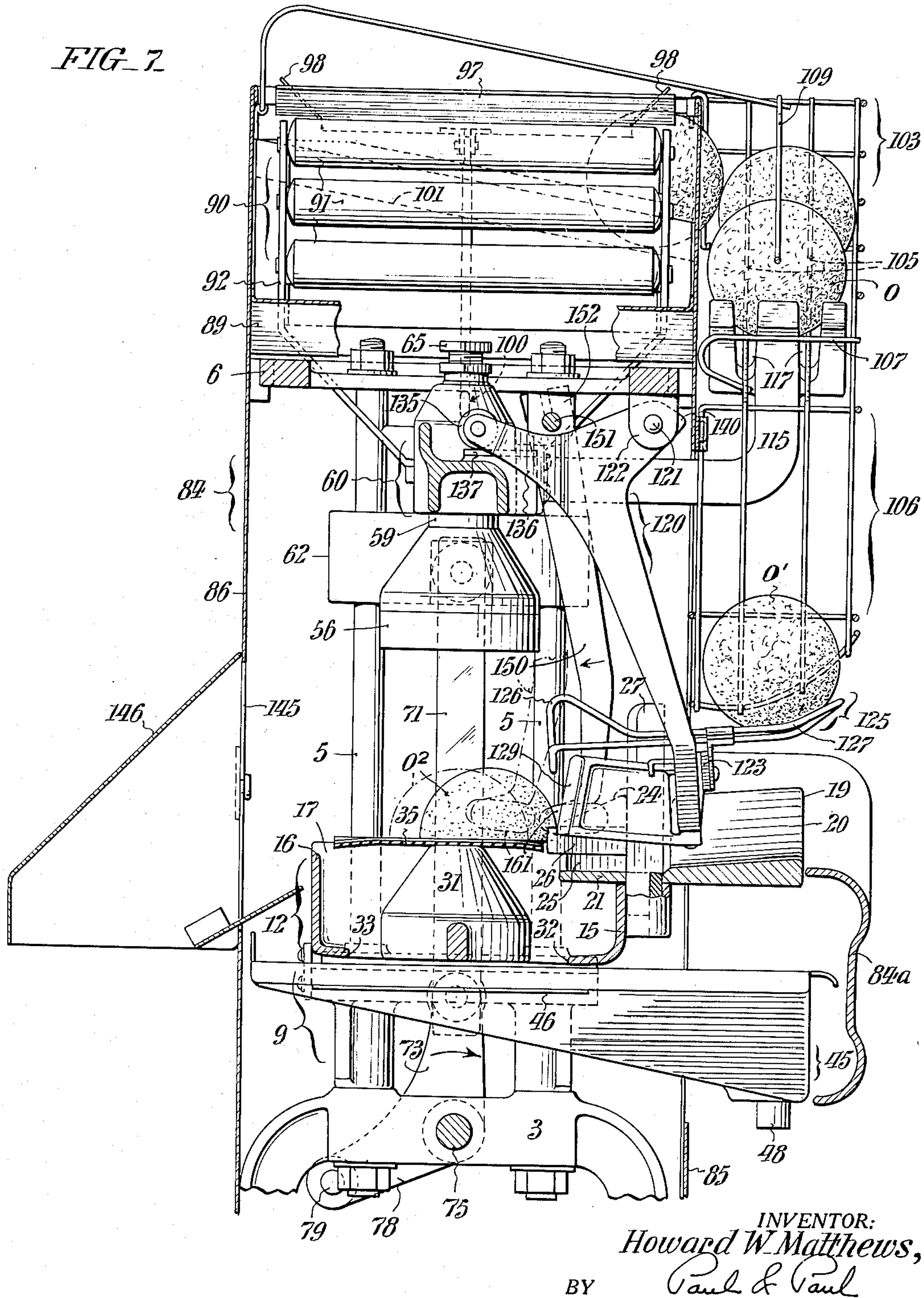

The mechanism of the machine is enclosed in a housing 84 of sheet metal having front, back and end walls 85, 86 and 87, 88 respectively. For decorative purposes, the housing is provided at the front with a detachable section 84*a* which is of hollow formation and recessed centrally of the top to clear the projection 19, and by which the front ends of the tray 12 and catch basin 45 are concealed from view. A transverse partition 89, sloped downwardly toward the right in Fig. 2, sets apart in the top of housing 84, a hopper into which a quantity of the oranges O is placed. Due to the slope of the partition 89, the oranges gravitate toward a gate 90 carried by the cross head 60. As shown, the gate 90 comprises a vertically-arranged series of horizontal rollers 91 which are journalled in a yoke-like frame 92 secured at its bottom to a pad 93 on the cross head 60, see Fig. 2. With its ends supported in lugs 95 at the back of yoke frame 92 adjacent the top, is a transverse rod 96 wherein is freely pivoted a transferrer 97 which is fashioned from sheet metal to shallow troughed cross section with upwardly inclined end wings 98. A torsion spring 99 normally tends to maintain the transferred 97 inwardly tilted as shown in Figs. 2 and 13, resting on the tops of the side arms of the yoke frame 92. At each rise of the cross head 60, the transferrer 97 is tilted outward or in the opposite direction as a consequence of the engagement of a pendent hook 100 thereon with the under side of the top frame 6 of the machine as shown in dash and dot lines in Fig. 2 and in Fig. 7, so that the oranges carried up by it are spilled into an adjacent forwardly and downwardly inclined single file V section chute 101 of sheet metal at the right hand end of the machine. As the oranges roll down the chute 101, they pass through a notch 102 in the top of the front wall 85 of housing 84 to the exterior and into a continuing chute structure 103 attached to said wall. The chute structure 103 is formed in this instance from wire with complemental declining portions 104 and 105 which terminate in a central downwardly-extending delivery spout 106. As the oranges roll down the right hand portion 105 of the chute 103, the foremost one of them is arrested by a barrier 107. The left hand portion 104 of the chute structure 103 is utilized merely for storage of the oranges which are prevented from falling into the spout 106 by the stop wire indicated at 108 in Fig. 1, and which is separated from the right hand portion by a guard wire 109. Each time that the cross head 60 is raised, a displacing element 115 extending forwardly and upwardly therefrom through a central opening 116 in the front wall of the housing 84, lifts the foremost orange over the barrier 107 in the right hand portion 105 of the chute structure 103 for release into the delivery spout 106. As shown in Fig. 7, the distal end of the element 115 is notched at the top and at 117 to clear the longitudinal wires of the chute structure 103.

Figure 8:
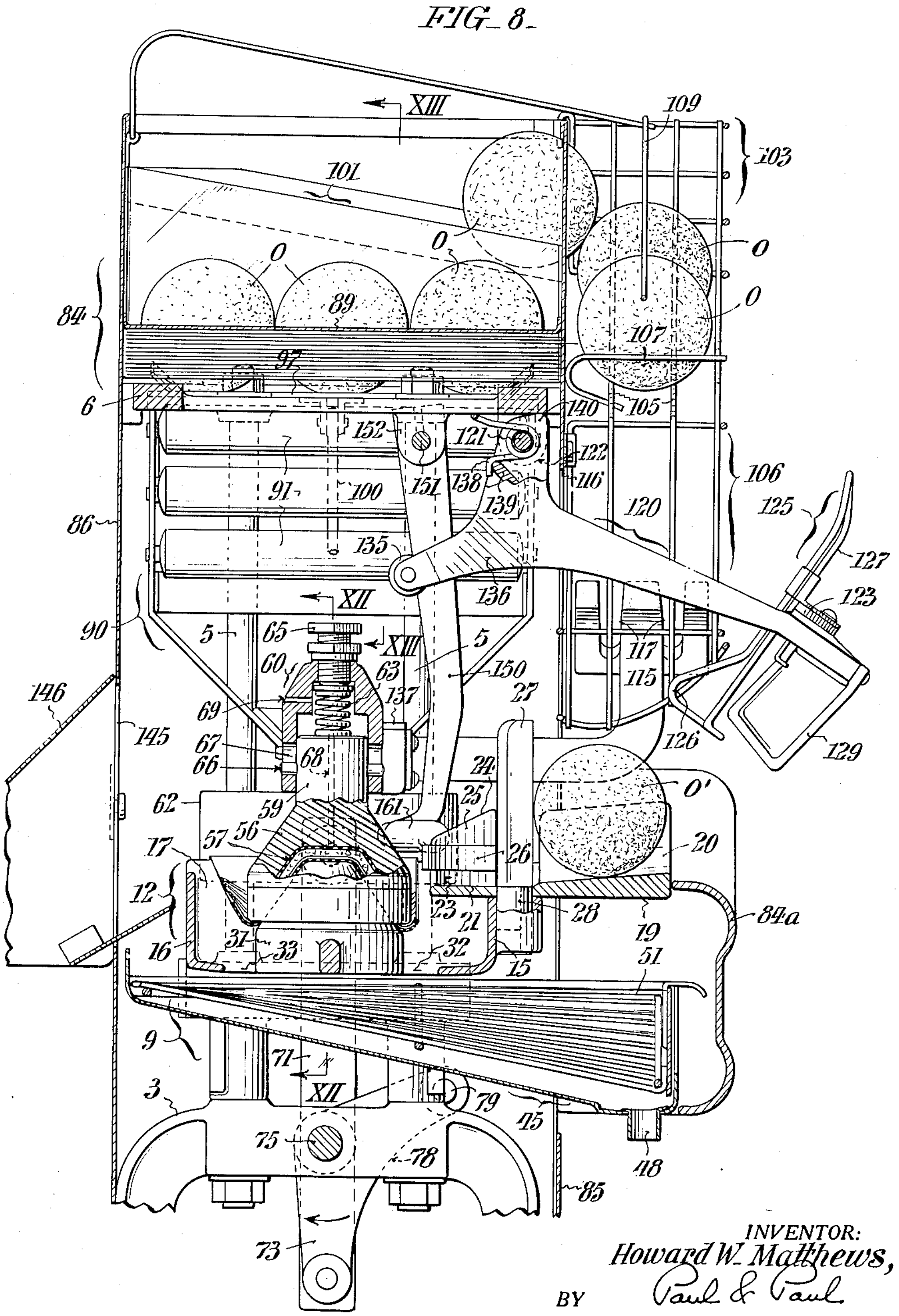
Figs. 7 and 8 are fragmentary views in vertical section, corresponding to Fig. 3, with various parts of the machine shown in different operative positions.
Figure 14:
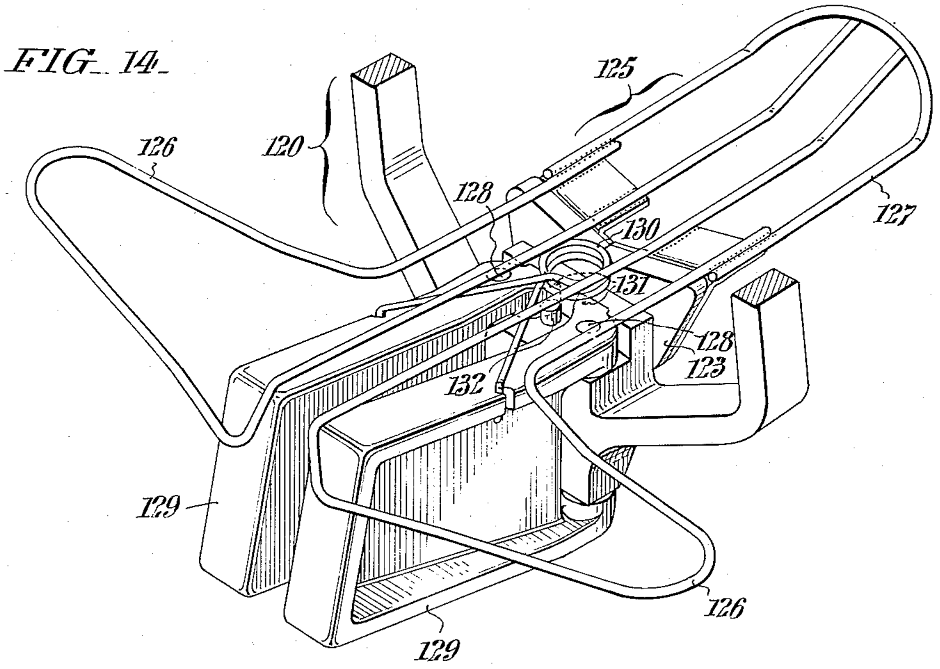
Fig. 14 is a perspective view of the means by which individual oranges are advanced to the severing means for subdivision into halves.

For the purpose of advancing the oranges successively released through the chute to the knife 27, there is provided a stirrup-like feeding element 120 which is swingable in and out through the opening 116 in the front casing wall, about a horizontal axis rod 121 extending between pendent lugs 122 on the top frame 6 of the machine. Secured to the swinging end of the element 120 is a small bracket 123 (Fig. 14) which supports a hand 125 fashioned from wire with upwardly-inclined lateral fingers 126. As shown, the palm portion 127 of the hand is curved to correspond with the rounding of the bottom end of the chute spout 106. Pivoted for lateral movement on pins 128 at the swinging end of the element 120 are feeding shoes 129 which are urged toward each other by a spring 130. At their pivot ends the shoes 129 have projections 131 which are adapted to engage a stop projection 132 on the element 120 so as to be normally maintained in parallel relation as shown in Fig. 14. A roller 135, mounted between inwardly-directed extensions 136 of the side arms of the element 120, bears upon a central pad 137 on the cross head 60 so that, as the latter rises, said element is moved inwardly in opposition to the force of a torsion spring indicated at 138 in Figs. 2 and 8. As shown, the outwardly bent center portion of the spring 138 bears against the bottom of the top frame 6, while its ends are engaged with a cross web 139 of the element 120 adjacent the fulcrum 121 of the latter. The element 120 is limited in its outward swing upon engagement of stop projections 140 on its pivot ears with the under side of the top frame 6 of the machine, as best seen in Fig. 8.

After the juice has been extracted from the halved oranges, the empty rinds are ejected through an opening 145 in the back wall 86 of the casing 84 and deflected downwardly by the sloping top of a guard hood 146 into a suitable receptacle, not illustrated. This function is accomplished by a pair of ejector arms 150 arranged laterally adjacent the press cups 55 and 56, said arms being secured to and pendent from a horizontal rock shaft 151 which is rotative in bearing lugs 152 on the top frame 6. One end of the shaft 151 is formed into a crank 153 (see Fig. 3) which, through a drop link 155, is connected to a rocker arm 156 medially pivoted at 157 on one of the bosses of the member 8 at the left side of the machine. By means of a lift spring 158 influential upon the link 155, a roller 159 on the free end of a follower arm 156 is yieldingly maintained in engagement with the periphery of a rotary cam 160 on shaft 75. At their free ends the ejector arms 150 carry non-metallic rollers 161 which, in being swung inward at the initiation of each operative cycle of the machine, assist in advancing the orange halves into position on the apron over the press domes 30 and 31, and which, at the completion of each cycle, expel the rinds through the opening 145 in the back wall of the casing 84 as will also be explained more fully later.

Figure 16:
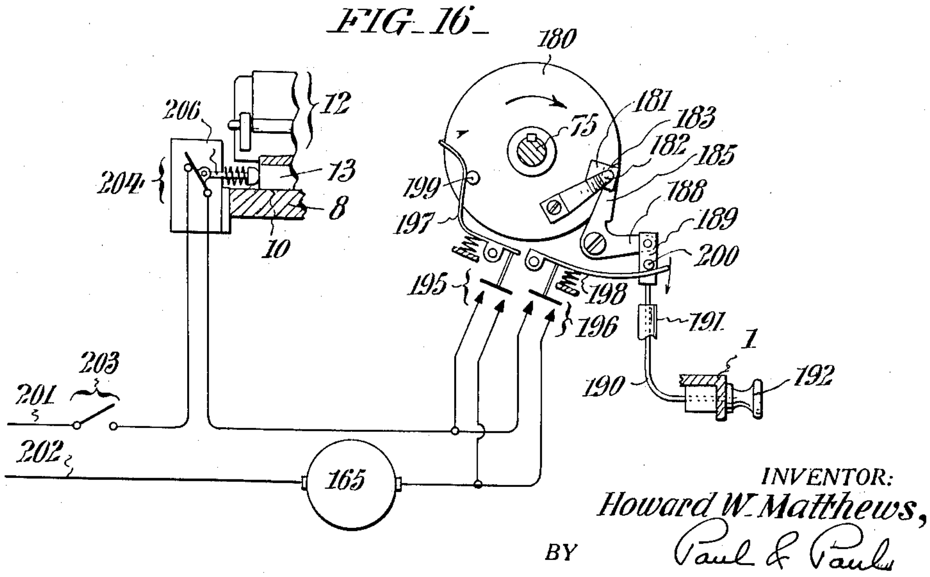
Fig. 16 is a wiring diagram showing the instrumentalities provided for controlling the electric motor by which the machine is operated under power.

The machine is powered by an electric motor 165 which is mounted, together with a speed reducing unit 166, on the base plate 1 between the side frames 2 and 3, see Figs. 2 and 6. By means of a coupling 167, the shaft 168 of the motor 165 is connected directly to the input shaft 169 of the unit 166, and the motion of the latter shaft is transmitted, through a system of speed-reducing spur gears 170, 171, 172, 173, 174 and 175, to a sleeve 176 (Fig. 6) free to rotate on shaft 75 within the casing 177 of said unit. Affixed to the protruding left hand end of sleeve 176 is a disk 178 with four peripheral notches 179 in quadrant relation; and keyed to the shaft 75 in juxtaposed relation to said disk, is a disk 180 with a transverse aperture adjacent its periphery occupied by a slidable clutch pin 181 which is adapted to engage into the individual notches of the first mentioned disk. The clutch pin 181 is normally held retracted against the pressure of a spring tongue 182, through engagement beneath its under beveled head 183, of a cam ended latch finger 185. As best seen in Fig. 5, the finger 185 is pivoted at 186 on a bracket plate 187 supported at one side of the gear casing 177, and has an arm 188 connected to a terminal clevis 189 at one end of a "Bowden" wire 190 which extends through a guide tube 191, and which at its opposite end is provided with a control knob 192 for manipulation at the front of the base plate 1 of the machine. The movement of the latch finger 185 is limited by stop projections 193 and 194 on the bracket plate 187 in the path of its arm 188. Supported adjacent the clutch disk 180 by the bracket plate 187, are starting and auxiliary microswitches 195 and 196 both of which are normally open as shown in the wiring diagram of Fig. 16, the actuating fingers 197 and 198 of said switches being arranged for operation respectively by a stud 199 on the disk 180 and by a stud 200 on the terminal clevis 189 of the "Bowden" wire. From Fig. 16, it will be noted that the switches 195 and 196 are connected in parallel, and that current for the operation of the motor 165 is supplied from the conductors 201 and 202 of a power line. In series with the switches 195 and 196 are a manually operable master switch 203 which may be of the toggle type, and a safety switch 204. The master switch 203 is located for convenience at the front of the base plate 1 as shown in Fig. 1; while the safety switch 204 is affixed to the rear end of guide member 8 as shown in Fig. 16 and arranged with its spring-loaded actuating member 206 confronting the rear end of the flange 13 on tray 12. As a consequence, switch 204 is held closed only if tray 12 is properly positioned in the machine and locked against accidental displacement by the keeper latch 40.

*Operation*

To operate the machine, the master switch 203 is first thrown to "on" position. Thereupon, by pulling upon the knob 192, the finger 185 (Figs. 5 and 6) is retracted from behind the head 183 of the clutch pin 181 in disk 180, and said pin 181 thrust forward by the spring 182 into the registering notch 179 in the disk 178 on shaft 75. At the same time, the starting switch 196 is closed through actuation of its finger 198 by the stud 200 at the terminal clevis 189 of the "Bowden" wire 190. The motor 165 is thereby set in motion and the shaft 75 driven in the direction indicated by the arrows in Figs. 3 and 5. As shaft 75 begins to turn, the stud 199 on disk 180 moves away from the actuating finger 197 of auxiliary switch 195 which thereupon closes automatically to maintain current flow to the motor 165 after the control knob 192 is pushed inward to its normal position. At the completion of a full rotation of shaft 75, clutch pin 181 is automatically retracted by camming action of its head with the beveled end of finger 185, and the switch 195 is opened through reengagement of its actuating arm 197 by the stud 199 on disk 180. Current flow is accordingly interrupted to the motor 165 to stop the machine after it has performed an operative cycle. During the cycle, the cross head 60 is moved through a complete reciprocation by action of the cranks 72 and 73 upon the connecting links 70 and 71, starting from, and returning to, the position in which it is illustrated in Figs. 2 and 3. At the initiation of the cycle, the cross head 60 is first raised, with incidental lifting of a number of oranges O from the hopper at the top of the machine by the transferer 97 which latter is eventually tripped as its pendent hook 100 encounters the upper frame 6, to spill the oranges into the chute 101 for gravitation into the continuing chute 103 at the front of housing 84. Also, as the cross head rises, the ejector 115 thereon, engages the lowermost orange O′ in the section 105 of chute 103 and lifts it over the barrier 107 so that it may fall into the spout 106 onto the concaved projection 19. In the meantime, by action of the rotary cam 160 (Fig. 3) upon roller arm 156 and the connecting link 155, the ejector arms 150 are swung outward to the position in which they are shown in Fig. 7, for withdrawal of its fingers 161 from beneath the cups 55 and 56. Concurrently, the feeding element 120 is swung inward by action upon the roller 135 on the pad 137 on the cross head 60 as the latter rises, with the result that its portion 125 is passed beneath the outlet end of spout 106 in time to trap the orange released as aforesaid. As the element 120 continues in its inward movement, another orange $O^2$ previously released onto the concaved projection 19 on shelf 18 in a manner presently explained, is advanced past the knife 27 and halved as shown in Figs. 9 and 10. During the final portion of the stroke of feeding element 120 in Fig. 10, the orange halves are displaced laterally relative to each other as they encounter the curved side faces 25 of the fixed projection 24 on the tray shelf 18. This separation of the orange halves is accomplished with the assistance of the shoes 129 which are forced apart against the pressure of spring 130 by camming action of their free ends with side faces 25 of projection 24. It is to be further noted that in the transition from the positions of Fig. 9 to the positions of Fig. 10, the orange halves follow the curved channels or gutters 21, 22 and are turned over thereby to fall, cut-faces downward, upon the apron 35 as a consequence of being engaged from behind by the fingers 161 on arms 150 as the latter follow inward after the feeding element 120. This actuation of the arms 150 is gentle and occurs as the roller 159 on arm 156 (Fig. 3) rides up the edge portion 160*a* of rotary cam 160. At the termination of this movement, the fingers 161 are advanced to the dash and dot line positions in Fig. 10 with the orange halves placed directly over the press domes 30, 31 of tray 12. As the feeding element 120 recedes, the hand 125 thereof passes from beneath the spout of chute 103, whereby the orange $O^1$ released as previously explained, is allowed to drop onto the concaved projection 19 of shelf 18 in readiness to be acted upon during the next operative cycle of the machine. The functions described up to this point all occur during the initial upward stroke portion of the cross head 60. During ensuing downward travel of the cross head, both the feeding element 120 and the ejector arms 150 recede so as to be out of the way of the press cups 55 and 56. By descent of the cups 55 and 56 through the position of Fig. 11 to that of Fig. 12, the orange halves are forced down over the fixed press domes 30 and 31 and the juice is incidently squeezed from the pulp, both the apron 35 and the diaphragms 57 yielding to temporary distortion as shown in Fig. 12. In this connection, it is to be observed from Fig. 12, that the raised ribs 39 of apron 35 serve, in conjunction with the slots 38, to establish channel passages by way of which the juice can flow from the orange sections into the tray 12. The juice so extracted eventually drains down through the openings 32, 33 in the bottom of tray 12 and into the catch basin 45, finally finding its way to the outlet 48 of the latter after removal therefrom by the strainer 51, of any seeds which may have been carried along with it. The extraction is consummated upon completion of the downward stroke of the crosshead 60, at which time the springs 63 (Fig. 8) will allow the cups 55 and 56 to yield upwardly to compensate for different thicknesses of the orange skins, and for any seeds which be trapped between said cups and the domes 30 and 31. As the cups clear the domes during the ensuing rise of the crosshead 60, the apron 35, in relaxing, re-assumes its normal horizontal condition and, in doing so, strips the orange rinds from the domes 30 and 31. On the other hand, the diaphragms 57, in relaxing, prevent the rinds from sticking within the cups 55 and 56. Thus, after the extraction, the rinds are left resting on the apron 35 in readiness for removal. Just as the cross head 60 reaches its normal rest position in rising, the roller 159 on arm 156 (Fig. 3) drops suddenly from the high concentric edge portion **160*b* of rotary cam 160 into the notch 160*c* of the latter with consequent impartation of a sudden inward kick to the ejector arms 150 whereby the rinds are removed from the apron 35 and expelled through the discharge opening 145 in the rear wall 86 of the machine housing. Attention is directed to the fact that during the latter portion of the rotation of shaft 75, the stud 79 (Fig. 5) on the arm 78 of crank 73 engages the top edge of the element 80 and depresses it against the pull of spring 83. The element 80 is finally lifted again by the spring 83 to prevent reverse rotation of said shaft upon stopping of the motor after the machine has completed its cycle. It will be apparent from Figs. 5, 6 and 16, that the machine will continue running if the knob 192 is held retracted, with consequent repetitions of its operative cycle and pressing of one orange after another as long as the supply hopper is kept filled. In the event that the attendant should fail to push the tray 12 all the way back in its guideways 10 and 11 on the supporting members 8 and 9, the safety switch 204 will remain open to prevent starting of the motor 165. The switch 204 thus serves as a safeguard to prevent damage which would occur to the machine if the domes 30 and 31 of the tray 12 should be out of axial alignment with the cups 55 and 56 when the cross head 60** descends.

Having thus described my invention, I claim:

1. In a machine for extracting the juice from oranges and the like, a pair of laterally-spaced stationary dome-like press elements; opposing coaxially-arranged cup-like female press elements movable from a retracted position into a pressing position relative to the stationary press elements; a shelf; a vertically-arranged knife blade located forwardly of the male press elements in the transverse medial plane between them, and upstanding from the shelf, said shelf having channels curving inward laterally away from the knife blade, and an upright triangular cam projection with arcuate side faces coincident with the rear walls of said channels; a normally-retracted feeding element operative to advance a whole orange on the shelf past the knife blade for severance into halves; a pair of spring connected spreader elements pivoted on the feeding element to swing outwardly relative to each other upon engagement with the arcuate side faces of the cam projection aforesaid thereby to displace the cut orange halves laterally and assist in turning them cut faces downward; and separate means operative to advance the cut orange halves into position over the male press elements and again later to eject the orange rinds from the machine upon retraction of the female press elements after the pressing is accomplished.

2. In a machine for extracting juice from oranges and the like, a pair of laterally-spaced dome-like male press elements; a pair of opposing coaxially-arranged cup-like female press elements, each having an elastic diaphragm spanning the open end thereof; a normally flat elastic apron stretched horizontally over the two male elements; means for moving the female press elements downward over the male elements to compress the fruit with incidental temporary deformation of the diaphragms and the apron; a stationary shelf; a vertically-arranged stationary knife blade positioned on the shelf forwardly of the two male press elements in the medial transverse plane between them; a feeding means operative at each actuation, to advance a whole orange past the knife blade for severance into halves; means on the shelf for incidentally turning the halves, cut faces downward, and displacing them laterally relative to the knife on the shelf; and ejector means for advancing the cut halves from the shelf into position on the apron over the male press elements, and for later ejecting the orange rinds from the machine upon retraction of the female press elements at the completion of each pressing operation.

3. In a machine for extracting the juice from oranges and the like, a dome-shaped male press element; an opposing coaxially-arranged female press element in the form of a cup normally spaced above the male element; an elastic diaphragm spanned across the open end of the female element and circumferentially secured to the edge of the cup; a normally flat elastic apron upon which a half-orange is placed cut face downward, said apron extending horizontally over the male component and being stretched between fixed anchorages beyond opposite sides of the male component; and means for moving the two press elements into interengaging relation to compress the half-orange with incidental temporary deformation of the diaphragm and the apron.

4. The invention according to claim 3, wherein the male press element is imperforate; and wherein the apron is apertured and provided with laterally spaced upstanding ribs.

5. The invention according to claim 3, wherein the male press element is constituted by an upstanding projection within a rectangular tray for receiving the extracted orange juice; and wherein opposite end walls of the tray provide the anchorages for the apron.

6. The invention according to claim 3, wherein the male press element is constituted by an upstanding projection within a rectangular tray for receiving the extracted orange juice, said tray being provided at the exterior faces of opposite end walls with laterally-spaced hook projections; and wherein the apron is provided along its opposite end edges with reinforcing rods having projecting end portions adapted to be engaged upwardly within said hook lugs to hold the apron stretched in place.

7. In a machine for extracting the juice from oranges and the like, a pair of laterally-spaced dome-shaped male press elements; a pair of correspondingly-spaced coaxially-arranged female press elements in the form of cups normally spaced above the male elements; an elastic diaphragm spanned across the open end of each female element and circumferentially secured to the edge of the cup; a normally flat elastic apron upon which half-oranges are placed cut face downward above the respective male press elements, said apron extending horizontally over the two male elements and stretched between fixed anchorages beyond them; and means for moving the two female elements down into interengaging relation with the male elements to compress the half-oranges, with incidental temporary deformation of the cup diaphragms and the apron.

8. The invention according to claim 7, wherein the apron is apertured in the regions above the male press elements and provided at said regions with laterally spaced transverse upstanding ribs.

9. The invention according to claim 7, further including a shelf; a vertically-arranged knife supported on the shelf forwardly of the two male press elements in the medial transverse plane between them; feeding means operative at each actuation to advance a whole orange past the knife blade for severance into halves and transfer the halves to the apron; means on the shelf for incidently spreading the orange halves laterally and turing them cut face downward; ejector means; and means for actuating the ejector means to center the cut orange halves on the apron over the male press elements in preparation for pressing, and again later after the pressing, to eject the rinds of the squeezed orange halves from the apron.

10. In a machine for extracting the juice from oranges and the like, a dome-like male press element; an opposing coaxially-arranged cup-like female press element normally spaced above the male element and having an elastic diaphragm spanning the open end thereof; a normally flat elastic apron stretched horizontally over the male element; means for moving the female element into engagement with the male element to compress the half-orange with incidental temporary deformation of both the diaphragm and the apron; a normally-retracted pivoted ejector arm; and means for actuating the ejector arm to swing over the apron upon relaxation of the latter after each pressing operation to eject the rind of the squeezed orange, said actuating means including a rotary shaft, a cam disk on said shaft having a notch in its periphery, a follower in engagement with the cam, and linkage connections between the follower and the ejector arm.

11. In a machine for extracting the juice from oranges or the like, a stationary dome-shaped male press element; an opposing coaxially-arranged cup-shaped female press element normally spaced above the male element; a support for the female element constrained to vertical reciprocation; a normally flat elastic apron extending horizontally over the male component and stretched between fixed anchorages beyond opposite sides of the male component for temporarily sustaining a half-orange face downward over the male element; a normally-retracted pivoted arm for ejecting the rind of the orange from the apron after the pressing operation; a rotary shaft; a crank on the shaft connected by a pitman to the support for the female press element; a cam disk on the shaft having a notch in its periphery; a follower riding on the periphery of the cam disk; linkage connections between the follower and the ejector arm; a sleeve on the shaft; an electric drive motor; speed reducing gearing between the motor and the sleeve; a normally disconnected clutch between the shaft and the sleeve; a normally open switch in circuit with the motor; a manual control for temporarily closing the switch to start the motor and for concurrently releasing the clutch; a normally open auxiliary switch also in circuit with the motor; and automatic means for closing the auxiliary switch as the shaft begins to turn, and for disconnecting the clutch and opening the auxiliary switch upon completion of the rotation of said shaft.

12. In a machine for extracting the juice from oranges or the like, a stationary dome-shaped male press element; an opposing coaxially-arranged cup-shaped female press element normally spaced above the male element; a support for the female element constrained to vertical reciprocation; a normally flat elastic apron extending horizontally over the male component and stretched between fixed anchorages beyond opposite sides of the male component for temporarily sustaining a half-orange cut face downward above the male element; a normally retracted pivoted arm for ejecting the rind of the orange from the apron after the pressing; a rotary shaft; a crank on the shaft connected by a pitman to the support for the female press element; a cam disk on the shaft having a notch in its periphery; a follower riding on the periphery of the cam disk; linkage connections between the follower and the pivoted arm; a sleeve on the shaft; an electric drive motor; speed reducing gearing between the motor and the sleeve; a disk affixed to the shaft; a juxtaposed disk on the sleeve; a spring pressed clutch pin axially slidable in one of the disks and adapted to engage a peripheral notch in the other disk; a cam element normally engaged behind a head on the clutch pin to normally hold the latter withdrawn from the notched disk; a normally open starting switch in circuit with the motor; manual control means for temporarily retracting the cam element to release the clutch pin into engagement with the notched disk, and for concurrently closing the switch temporarily to start the motor; a normally open auxiliary switch also in circuit with the motor; and automatic means whereby the auxiliary switch is closed as the shaft begins to turn and whereby it is re-opened upon completion of a rotation of said shaft.

13. The invention according to claim 12, wherein the male press element is within a tray removably engaged in a fixed guideway, and further including a safety switch in circuit with the motor, said safety switch having its actuating member in the slide path of the tray so as to be closed only when said tray is properly positioned in its guideway.

14. The invention according to claim 12, wherein the male press element is within a tray removably engaged in a fixed guideway, and further including a safety switch in circuit with the motor, said switch having its actuating member in the slide path of the tray so as to be closed only when said tray is properly positioned in its guideway; and self-latching means for locking the tray against accidental displacement when it is properly positioned in its guideway.

15. A machine for extracting the juice from oranges and the like according to claim 2, further including a rotary drive shaft; and operating connections between said shaft and the female press elements, the feeding means, and the ejecting means.

References Cited in the file of this patent

UNITED STATES PATENTS

| | | |
|---|---|---|
| 621,773 | Blatz | Mar. 21, 1899 |
| 968,344 | Hackney | Aug. 23, 1910 |
| 1,922,818 | Nordstrom | Aug. 15, 1933 |
| 2,112,872 | Wilson | Apr. 5, 1938 |
| 2,311,565 | Nelson | Feb. 16, 1943 |
| 2,317,147 | Keene | Apr. 20, 1943 |
| 2,342,645 | Criley | Feb. 29, 1944 |
| 2,420,681 | Peterson | May 20, 1947 |
| 2,508,804 | Schwindt | May 23, 1950 |
| 2,512,275 | Hawk | June 20, 1950 |
| 2,522,800 | Quiroz | Sept. 19, 1950 |
| 2,560,096 | Elterman | July 10, 1951 |
| 2,565,949 | Clifford | Aug. 28, 1951 |
| 2,574,922 | Karp et al. | Nov. 13, 1951 |
| 2,575,734 | Schulman | Nov. 20, 1951 |

FOREIGN PATENTS

| | | |
|---|---|---|
| 178,812 | Switzerland | 1935 |